United States Patent
Han et al.

(10) Patent No.: US 8,534,233 B1
(45) Date of Patent: Sep. 17, 2013

(54) HANDS-FREE PET LEASH

(76) Inventors: Steven Han, Bellevue, WA (US);
Katherine J Kim, Bellevue, WA (US)

(*) Notice: Subject to any disclaimer, the term of this patent is extended or adjusted under 35 U.S.C. 154(b) by 0 days.

(21) Appl. No.: 13/449,692

(22) Filed: Apr. 18, 2012

(51) Int. Cl.
*A01K 27/00* (2006.01)

(52) U.S. Cl.
USPC .......................................... 119/795; 119/792

(58) Field of Classification Search
USPC .................. 119/795, 769, 770, 774, 792, 793, 119/794, 857
See application file for complete search history.

(56) References Cited

U.S. PATENT DOCUMENTS

| | | | | |
|---|---|---|---|---|
| 1,684,110 A * | 9/1928 | Pickles | ........................ | 119/857 |
| 2,233,397 A * | 3/1941 | Bloom | ........................ | 119/857 |
| 2,996,228 A * | 8/1961 | Bauman | ........................ | 224/184 |
| 3,077,292 A * | 2/1963 | Gehrke | ........................ | 224/184 |
| 3,088,438 A * | 5/1963 | Oliphant | ........................ | 119/770 |
| 3,769,938 A * | 11/1973 | Hudziak et al. | ............... | 128/874 |
| 4,406,348 A * | 9/1983 | Switlik, II | ........................ | 182/3 |
| 4,667,624 A * | 5/1987 | Smith | ........................ | 119/770 |
| 5,325,818 A * | 7/1994 | Leach | ........................ | 119/770 |
| 5,588,940 A * | 12/1996 | Price et al. | ........................ | 482/105 |
| 5,664,844 A * | 9/1997 | Greene | ........................ | 297/485 |
| 5,913,285 A * | 6/1999 | Pritchard | ........................ | 119/771 |
| 5,927,235 A * | 7/1999 | Olaiz | ........................ | 119/770 |
| 6,192,835 B1 * | 2/2001 | Calhoun et al. | ............... | 119/792 |
| 6,626,131 B2 * | 9/2003 | Moulton, III | ................ | 119/770 |
| 6,851,393 B2 * | 2/2005 | Bremm | ........................ | 119/770 |
| 6,932,027 B1 * | 8/2005 | Whitney | ........................ | 119/770 |
| 6,971,476 B2 * | 12/2005 | Wolner et al. | ..................... | 182/3 |
| 7,387,088 B2 * | 6/2008 | Sporn | ........................ | 119/856 |
| 7,709,714 B2 * | 5/2010 | Harbaugh et al. | .............. | 84/327 |
| 8,166,924 B2 * | 5/2012 | Cho | ........................ | 119/792 |
| 8,342,137 B1 * | 1/2013 | Burkhardt | ........................ | 119/792 |

* cited by examiner

*Primary Examiner* — Yvonne Abbott
(74) *Attorney, Agent, or Firm* — Mitchell Law PLLC; Matthew W. Mitchell (57) ABSTRACT

A wearable apparatus for using a leash in a hands-free manner is provided. The apparatus includes a centrally positionable connection hub connectable to the leash, first and second straps structured to extend over a person shoulders, third and fourth straps structured to extend around a portion of a person's waist, and a back support connected to the first, second, third, and fourth straps. The first, second, third, and fourth straps are configured to removeably and releasably attach to the connection hub.

19 Claims, 8 Drawing Sheets

HANDS-FREE PET LEASH

TECHNICAL FIELD

This disclosure relates to pet leashes, and more particularly to hands-free pet leash apparatuses.

BACKGROUND

The statements in this section merely provide background information related to the present disclosure and may not constitute prior art.

Leashes are known to include straps or cords and used for restraining and guiding a dog or other domestic animal. Generally, leashes include a handle connected to the strap on a first end and a mechanical connector on the second end configured to selectively connect to a pet's collar. Hand-held retracting leashes are known whereby the leash selectively retracts upon a user request such as by engaging a spring or mechanical load. Pet leashes require a user to hold the leash during use; forces provided by the pet tugging and lurching are communicated through the strap to the arm of the operator. When using a hand-held leash to restrain a pet while engaging in certain activities such as walking or jogging, can cause asymmetrical or uneven kinetics causing harmful muscle stresses, soreness, and injuries. Further, jogging and other exercises can effect a spasmodic motion to the pet, and the pet's neck resulting in pet injuries and can translate resistance back to the hand and arm resulting in further asymmetrical kinetics.

Therefore, there exists a need for a hands-free pet leash to decrease harmful kinetics such as lurching while engaging in recreational and other activities. Further, there exists a need to decreases stresses on an abdominal area including the upper and lower back resulting from a pet pulling on a leash.

SUMMARY

A wearable apparatus for using a leash in a hands-free manner is disclosed. The apparatus includes a centrally positionable connection hub connectable to the leash, first and second straps structured to extend over a person shoulders, third and fourth straps structured to extend around a portion of a person's waist, and a back support connected to the first, second, third, and fourth straps. The first, second, third, and fourth straps are configured to removably and releasably attach to the connection hub.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
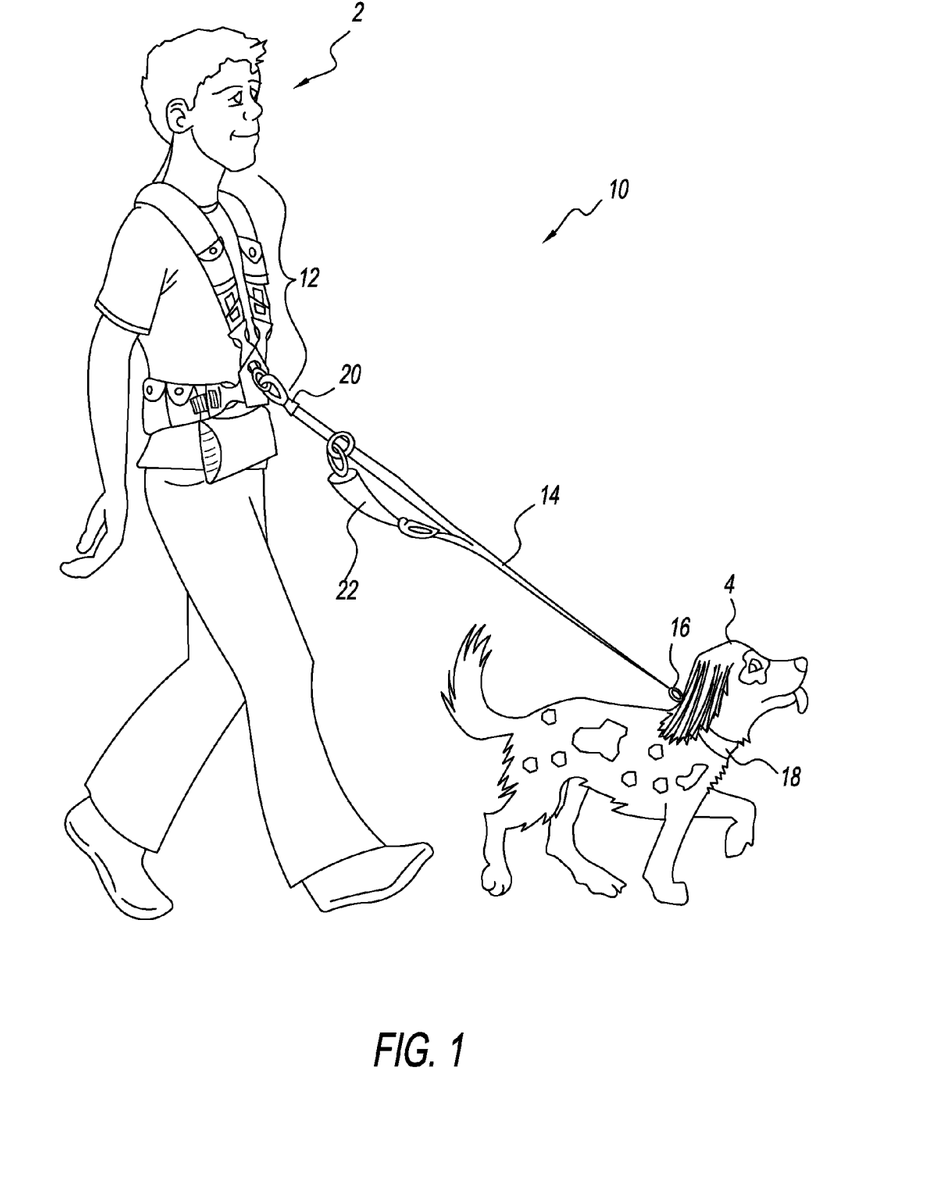
FIG. 1 shows a hands-free vest leash system, in accordance with the present disclosure.

Referring now to the drawings, wherein the depictions are for the purpose of illustrating certain exemplary embodiments only and not for the purpose of limiting the same, FIG. 1 shows a vest leash system 10 worn by a user 2 accompanied by a pet 4. The vest leash system 10 includes a vest 12, a leash 14, and a mechanical collar connector 16 configured to attach to a collar 18, and a mechanical vest connector 20 configured to connect to the vest 12. The leash 14 preferably includes a handle 22. The leash 14 may be any type configured to secure the pet 4 to the vest 12. The handle 22 may be any type suitable for holding by the user 2 when manual directing or restraint is desired, such as when connecting the mechanical vest connector 20 to the vest 12.

The mechanical collar connector 16 and mechanical vest connector 20 preferably include swivel means to prevent twisting and tangling of the leash 14 due to the relative movement of user 2 and pet 4. Although various means may be used to connect the leash 14 to the collar 18 and vest 12, for example, the mechanical collar connector 16 and the mechanical vest connector 20 may be connected by various strap or tie members, or may be directly attached either by integral molding, welding, tacking, or other fastening.

Figure 2:
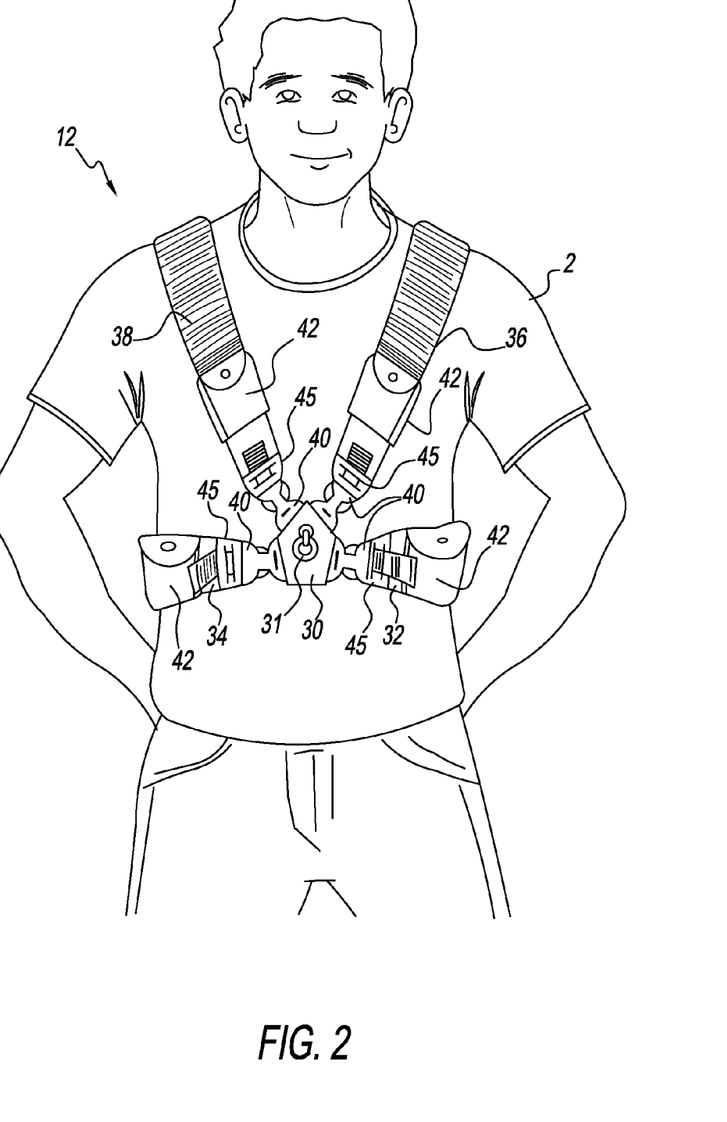
FIG. 2 is a front view of the hands-free vest leash system showing shows the vest worn by the user and a connection hub, in accordance with the present disclosure.

FIG. 2 shows the vest 12 worn by the user 2. The vest 12 includes a connection hub 30, a left waist strap 32, a right waist strap 34, a left shoulder strap 36, and a right shoulder strap 38. The connection hub 30 includes a mechanical fastener 31 to connect the mechanical vest connector 20 on the leash 14. In one embodiment, the fastener 31 is a ring, hoop-shaped component, a loop configured to receive a carabiner, snap hook or other mechanical connector. The straps, 32, 34, 36, and 38 are each connected at one end to a mechanical fastener 40 configured to securably and releasably couple to the connection hub 30 as described in greater detail herein below with reference to FIGS. 3A and 3B. The straps 36 and 38 are each structured to extend over one shoulder of a person. The straps 32 and 34 are each structured to extend around a portion of a person's waist. The straps 32, 34, 36, and 38 are preferably length-adjustable. As FIG. 2 shows, each of the straps 32, 34, 36, and 38 may include a buckle 45 configurable to adjust length of an associated strap. The connection hub 30 is preferably positioned centrally, e.g., at a user's mid-section as substantially shown in FIG. 2 with respect to a user's front side, thereby disbursing tension forces communicated from the leash evenly via the straps 32, 34, 36, and 38.

As FIG. 2 shows, the vest 12 may include a number of pockets 42. The disclosure herein can be applied to various arrangements and disposition of the pockets 42 on the straps 32, 34, 36, and 38 and vest 12, and is therefore not intended to be limited to the particular exemplary arrangement shown and described herein. The straps 32, 34, 36, and 38 may be made of various fabrics, plastics, cloth, or other flexible materials. In one embodiment, woven or webbed nylon is used.

Figure 3A:
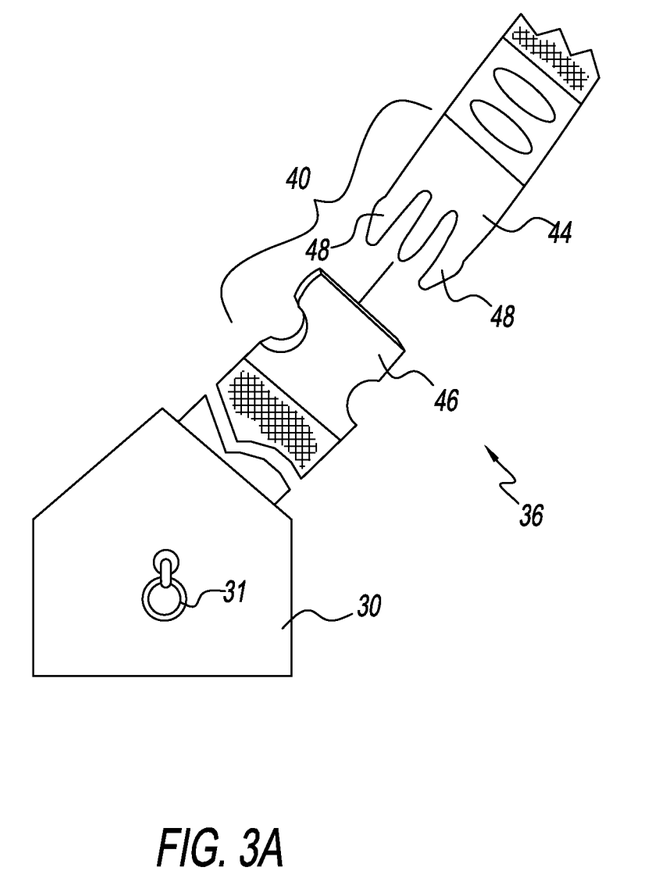
FIG. 3A shows an embodiment of the connection hub, in accordance with the present disclosure.

FIG. 3A shows an embodiment of the connection hub 30 and an exemplary mechanical fastener 40 used to connect an exemplary strap to the connection hub 30. The fastener 40 is, in one embodiment, a quick-release connector including a coupling or pronged member 44 and a receiving member 46.

As one skilled in the art will readily recognize, the quick-release connectors are a type of mechanical fastener requiring modest pressure on outside prongs 48 to flex the prongs 48 inward and allow the coupling member 44 and the receiving member 46 to decouple. The mechanical fastener 40 is preferably attached to each distal end of the straps 32, 34, 36, and 38 as shown in FIG. 3A with reference to exemplary strap 36. Each of the straps 32, 34, 36, and 38 has attached thereto a strap adjuster that can be used to individually adjust the lengths of the straps 32, 34, 36, and 38 by a user for proper fit and comfort based on the size and shape of the user. For example, an adjustable loop may be included near the coupling member 44.

Preferably, a first end of the strap is looped through quick-release pronged member and is connected to the mid-section of the strap by a sliding buckle to form a loop for adjusting strap length. It is contemplated by this disclosure that various pronged and buckle connector members may be switched in position, for example, to place buckle connectors on each end of the strap and pronged members on the hub connector 30. However, the preferred configuration places the pronged connectors on the strap, and the buckle connectors on both the hub connector 30.

Figure 3B:
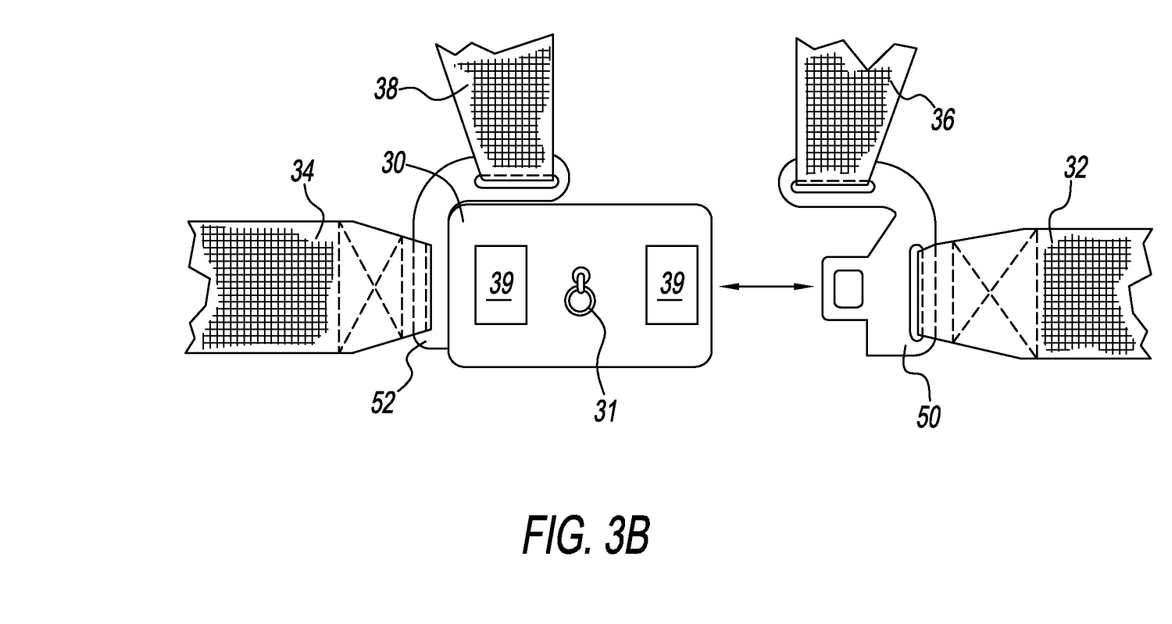
FIG. 3B shows a further embodiment of the connection hub, in accordance with the present disclosure.

FIG. 3B shows a second embodiment of the connection hub 30 and mechanical fastener 40. The mechanical fastener 40 may be implemented as a buckle as depicted by exemplary first and second buckle 50 and 52 in FIG. 3B. The buckles 50 and 52 may be attached to multiple straps. In one embodiment, a first buckle 50 is attached to straps 32 and 36, while the second buckle 52 is attached to straps 34 and 38. When inserted into the connection hub 30, the buckle is secured by a depressed tab, as one skilled in the art will understand. A release button 39 is configured to permit a user to decouple the buckles 50 and 52 by depressing the respective release buttons 39.

Figure 3C:
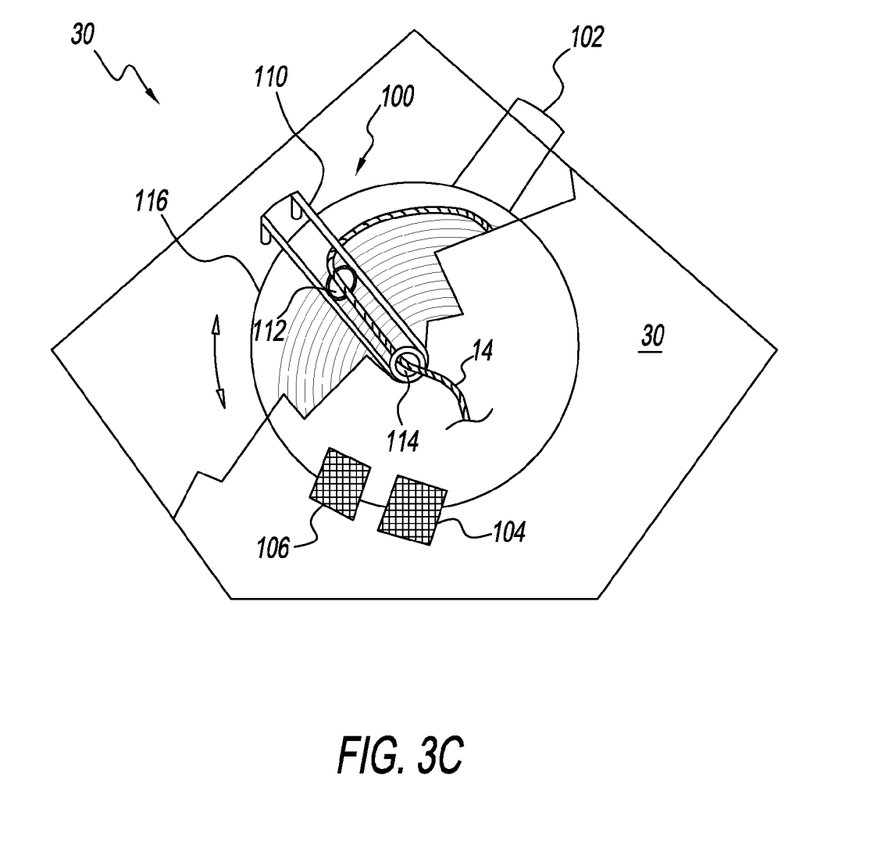
FIG. 3C shows another embodiment of the connection hub, in accordance with the present disclosure.

FIG. 3C shows a cross sectional view of a third embodiment of the connection hub 30 configured with a retractable leash assembly 100. The retractable leash assembly 100 includes components for retracting the leash 14, catching the leash, and releasing the leash 14 so that a pet may extend the length of leash out of the connection hub 30. A first button 102 is configured to release the leash 14. A second button 104 is configured to catch the leash 14, i.e., hold the leash so that the pet may not extend the length of the leash out of the connection hub 30. A third button 106 is configured to retract the leash 14 into the connection hub 30 using one of multiple methods to place a pulling force of the leash, e.g., via spring loaded means or other biasing force. The retractable leash assembly 100 is arranged within the connection hub 30 to center the leash 14 outwardly from a surface therefore such as via a central opening 114. A rotationally configured frame 110 is configured to urge the leash 14 over a bearing 112 or equivalent mechanical component and out of the connection hub 30. In one embodiment, the retractable leash assembly 100 includes a roller 116 configured to receive and store the leash 14. The roller 116 is preferably biased by a spring force that co-operates with a spool or ratchet wheel forming the basic element of the take-up roller device and functioning, together with a spring charging the leash with a certain pull-back force, in a manner well-known in the art, so that this need not be described in greater detail in the context of the present disclosure.

Figure 4:
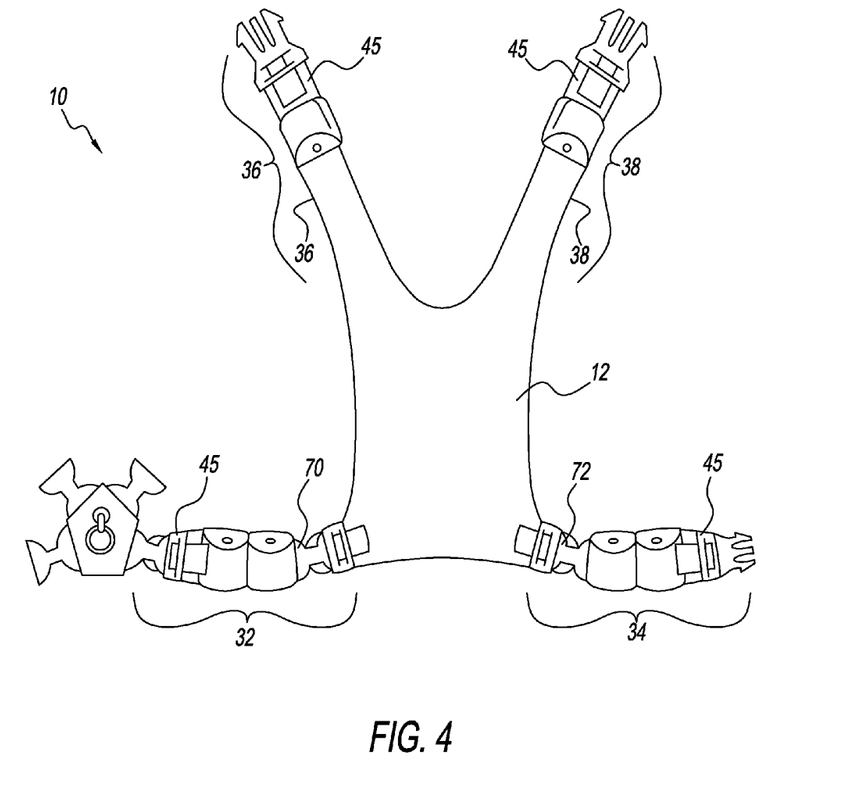
FIG. 4 shows a back view of the vest leash system, in accordance with the present disclosure.

FIG. 4 shows a back view of the vest leash system 10 unworn and having the straps 32, 34, 36, and 38 disconnected from the connection hub 30. As FIG. 4 shows, the vest 12 includes a back portion contiguously connecting distal ends of the straps 32, 34, 36, and 38. Position of the straps 32, 34, 36, and 38 assist with back support and its being held in position with respect to the user's body when worn, as well as to help distribute the pressure from the straps 32, 34, 36, and 38 when under tension during use. As described herein above, each of the straps 32, 34, 36, and 38 has attached thereto a strap adjuster 45 to fit the vest for proper and comfortable fitting and to preferably disburse tension forces from the leash as communicated through the straps 32, 34, 36, and 38. In one embodiment, additional mechanical fasteners 70 and 72 are included on the straps 32 and 34. The additional mechanical fasteners 70 and 72 enable the user 2 to exchange or swap in waist straps having various component arrangements. For example, a user may swap in a waist strap without pockets for a waist strap with pockets, or swap in waist straps configured to accept a hand warmer, as described herein below.

Figure 5:
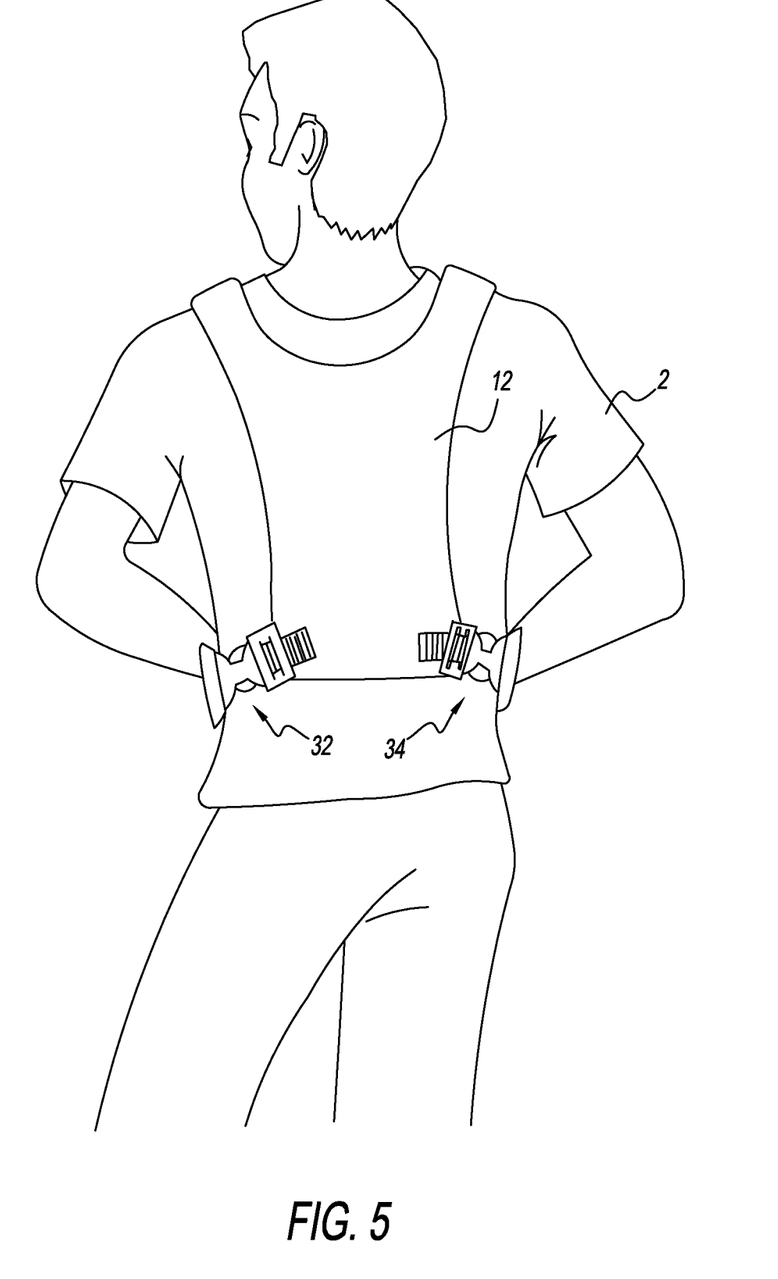
FIG. 5 shows a back view of the vest leash system worn by a user, in accordance with the present disclosure.

FIG. 5 shows a back view of the vest leash system 10 worn by a user 2. As FIG. 5 shows, the vest 12 is formed to a back of a user 2. The vest 12 is a back support configured to cover an upper and lower back portions of a person and configured to disburse forces communicated from the leash to the upper and lower back. The left and right waist strap 32 and 34 are configured to disburse tension forces communicated by the leash 14 to the lower back of the user 2. The left and right shoulder strap 36 and 38 are configured to disburse tension forces communicated by the leash 14 to the upper back of the user 2. The straps 32, 34, 36, and 38 are preferably integrally connected to the vest 12 including by means such as interwoven, sticking, or other contiguously structured fabric. Although, as shown in FIG. 5, the waist straps may be securably and releasably connected via a mechanical fastener.

In operation, such as when a pet pulls on the leash, the vest 12 distributes the tension and other forces when in use over the user's back, shoulders and chest, for example and may provide for greater comfort and stability to the user. The strap adjusters 45 can further assist in providing comfort, stability, and force disbursement to the user 2 when using the vest leash system 10.

Figure 6:
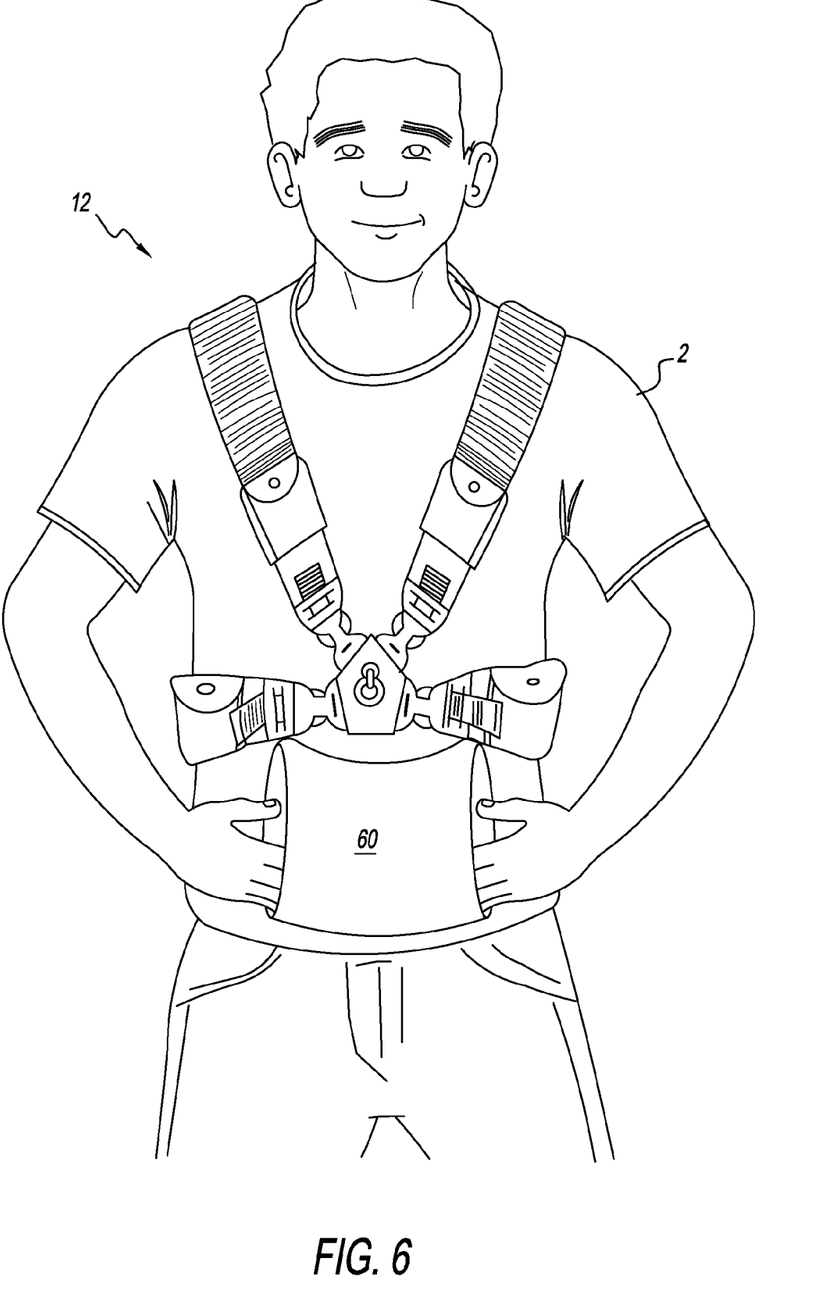
FIG. 6 shows an embodiment of the vest leash system including a hand warmer sleeve, in accordance with the present disclosure.

FIG. 6 shows an embodiment of the vest leash system 10 including a hand warmer sleeve 60. As FIG. 6 shows, the hand warmer sleeve 60 is configured to receive hands of the user 2 within a cavity of the sleeve 60. The sleeve may be fastened to the left and right waist strap 32 and 34 using any suitable means such as tying integrally formed or woven straps to the left and right waist strap 32 and 34. In one embodiment, one side of the sleeve 60 is sewn in to one of the left and right waist strap 32 and 34, while the other side of the sleeve 60 is selectively connected to another of the left and right waist strap 32 and 34.

As discussed above, during use of the leash 14, the mechanical fasteners 40 are secured to the connection hub 30. Alternatively, if the user wishes to leave the pet 4 on the leash but wants to hold the leash, the user may quickly disconnect the leash 14 from the fastener 31 via a carabiner, snap hook or other mechanical connector connected to a proximal end of the leash 14. In use, the user adjusts the vest 12 and the straps 32, 34, 36, and 38 to a proper length for a comfortable fit and connects the leash 14 to the connection hub 30. Thus, while running or walking with the pet 4 on the leash 14, the user 2 enjoys the security and companionship of having the pet leashed and nearby, but also enjoys the convenience of having hands unoccupied. In all circumstances, the vest leash system 10 is hands-free, except for the brief snapping and unsnapping of the straps 32, 34, 36, and 38 and leash 14.

Although the preferred use for the vest leash system 10 is for a runner/jogger who wants to train and exercise with a pet, the vest leash system 10 may have other uses. For example, the collar connector could be attached to a toddler's harness and the system 10 could be a simple, safe means for protecting a walking child in a public place, such as a shopping mall or park.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A wearable apparatus for using a leash in a hands-free manner, the apparatus comprising:
    a connection hub connectable to the leash;
    a first strap configured to removably connect to the connection hub, the first strap structured to extend over one shoulder of a person;
    a second strap configured to removably connect to the connection hub, the second strap structured to extend over one shoulder of a person;
    a third strap configured to removably connect to the connection hub, the third strap structured to extend around a portion of a person's waist;
    a fourth strap configured to removably connect to the connection hub, the fourth strap structured to extend around a portion of a person's waist; and
    a back support connected to the first, second, third, and fourth straps, wherein the back support is integrally formed to the first and second straps.

2. The wearable apparatus of claim 1, wherein the first, second, third, and fourth straps each include length adjustment means.

3. The wearable apparatus of claim 1, wherein the first strap and the third strap are connected to a first mechanical fastener and wherein the second strap and the fourth strap are connected to a second mechanical fastener.

4. The wearable apparatus of claim 3, wherein the connection hub is configured to securably and releasably receive the first and second mechanical fasteners.

5. The wearable apparatus of claim 1, wherein the connection hub is configured to receive a quick-release mechanical fastener.

6. The wearable apparatus of claim 5, wherein the quick-release mechanical fastener comprises a three-pronged member having outside prongs, the outside prongs configured to flex inward allowing the three-pronged member to couple and decouple to a receiving member.

7. The wearable apparatus of claim 6, wherein the three-pronged member is attached to each distal end of the first, second, third, and fourth straps and wherein the receiving member is attached to the connection hub.

8. The wearable apparatus of claim 1, wherein the connection hub connects to the leash using a swivel.

9. The wearable apparatus of claim 1, wherein the connection hub is centrally positionable at a person's mid-section.

10. The wearable apparatus of claim 1, further comprising a plurality of pockets.

11. The wearable apparatus of claim 1, further comprising a hand warmer removably and releasably attachable to the third and fourth straps.

12. A wearable apparatus for using a leash in a hands-free manner, the apparatus comprising:
    a connection hub connectable to the leash;
    a first strap configured to removably connect to the connection hub, the first strap structured to extend over one shoulder of a person;
    a second strap configured to removably connect to the connection hub, the second strap structured to extend over one shoulder of a person;
    a third strap configured to removably connect to the connection hub, the third strap structured to extend around a portion of a person's waist;
    a fourth strap configured to removably connect to the connection hub, the fourth strap structured to extend around a portion of a person's waist; and
    a back support integrally connected to the first and second straps, the back support adaptable to cover an upper and lower back portions of a person and configured to disburse forces communicated from the leash to the upper and lower back.

13. The wearable apparatus of claim 12, wherein the first, second, third, and fourth straps each include length adjustment means.

14. The wearable apparatus of claim 12, wherein the first strap and the third strap are connected to a first mechanical fastener and the second strap and the fourth strap are connected to a second mechanical fastener and wherein the connection hub is configured to securably and releasably receive the first and second mechanical fasteners.

15. The wearable apparatus of claim 12, wherein the connection hub is configured to receive a quick-release mechanical fastener comprising a three-pronged member having outside prongs, the outside prongs configured to flex inward allowing the three-pronged member to couple and decouple to a receiving member, wherein the three-pronged member is attached to each distal end of the first, second, third, and fourth straps and wherein the receiving member is attached to the connection hub.

16. The wearable apparatus of claim 12, further comprising a plurality of pockets.

17. The wearable apparatus of claim 12, further comprising a hand warmer removably and releasably attachable to the third and fourth straps.

18. A wearable apparatus for using a leash in a hands-free manner, the apparatus comprising:
    a connection hub connectable to the leash;
    a first and second length-adjustable strap connected to a first mechanical fastener configured to securably and releasably connect to the connection hub, the first and second length-adjustable straps each structured to extend over one shoulder of a person;
    a third and fourth length-adjustable strap connected to a second mechanical fastener configured to securably and releasably connect to the connection hub, the third and fourth length-adjustable straps each structured to extend around a portion of a person's waist; and
    a back support integrally connected to the first and second straps, the back support adaptable to cover an upper and lower back portions of a person and configured to disburse forces communicated from the leash to the upper and lower back.

19. The wearable apparatus of claim 18, further comprising: a plurality of pockets and a hand warmer removably and releasably attachable to the third and fourth straps.

* * * * *